United States Patent [19]
Anderson

[11] Patent Number: 5,715,775
[45] Date of Patent: Feb. 10, 1998

[54] BEARING INSERT FOR PIVOTED CONNECTIONS

[75] Inventor: Bernard O. Anderson, Glendale, Ariz.

[73] Assignee: Nielsen Industries, Inc., Phoenix, Ariz.

[21] Appl. No.: 667,446

[22] Filed: Jun. 21, 1996

[51] Int. Cl.⁶ .................................................. A01K 1/06
[52] U.S. Cl. ........................ 119/739; 119/740; 119/750
[58] Field of Search .................................... 119/739, 740, 119/742, 744, 750, 748, 741, 738

[56] References Cited

U.S. PATENT DOCUMENTS

| | | | |
|---|---|---|---|
| 1,857,412 | 5/1932 | Sutton | 119/750 |
| 3,863,604 | 2/1975 | Nielsen et al. | |
| 4,037,566 | 7/1977 | Albers . | |
| 4,051,813 | 10/1977 | Albers . | |
| 4,185,592 | 1/1980 | Albers, Sr. | 119/740 |
| 4,314,528 | 2/1982 | Fogleman | 119/740 |
| 4,413,765 | 11/1983 | Tracy . | |
| 4,457,265 | 7/1984 | Anderson . | |
| 4,476,815 | 10/1984 | Albers . | |
| 4,495,897 | 1/1985 | Albers . | |
| 4,867,105 | 9/1989 | Hatfield . | |
| 4,930,452 | 6/1990 | DeSilveira . | |
| 4,976,224 | 12/1990 | Hatfield . | |
| 5,226,387 | 7/1993 | Anderson . | |
| 5,373,813 | 12/1994 | Da Silveira | 119/740 |
| 5,564,368 | 10/1996 | Hepp et al. | 119/740 |

OTHER PUBLICATIONS

Hercules Incorporated specification sheet for 1900 UHMW Polymer, dated 1979.

*Primary Examiner*—Paul T. Hirsch
*Attorney, Agent, or Firm*—Charles E. Cates; Frank T. Barber

[57] ABSTRACT

A pivot arrangement for holding structural members, such as cattle stanchions, in pivotal engagement, with improved durability and wear resistance at the pivot point. In the stanchion (25) containing the pivot holes (36) and (37), an ultrahigh molecular weight, high density resin plastic insert (38) is positioned on the interior of the stanchion in the area surrounding the pivot holes (36) and (37). The resin insert has wear-resistant properties greater than the metal material from which the stanchion (25) is made. A pre-drilled bearing channel (42) in the plastic insert (38) is aligned to register concentrically with the pivot holes (36) and (36), and the plastic insert is secured in this position by dimples in the walls of the stanchion (25). The bore of the bearing channel (42) is slightly smaller than the diameter of holes (36) and (37), and therefore, when the pivot pin from a cooperating stanchion (26) is placed in the aligned pivot holes and bearing channel, the wearing caused by rotation of the pivot pin is borne by the bearing channel, out of contact with the walls of stanchion (25).

9 Claims, 2 Drawing Sheets

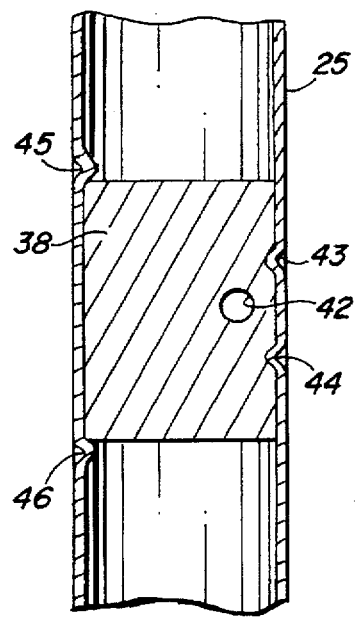
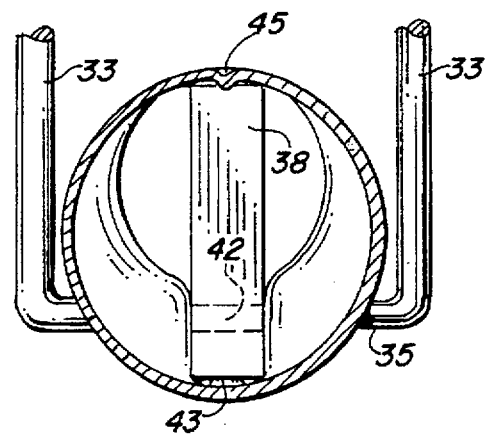
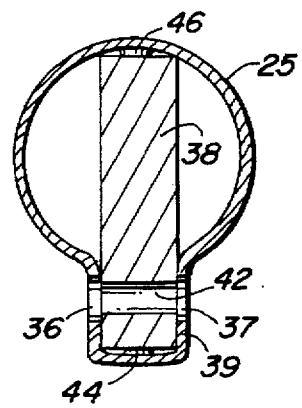
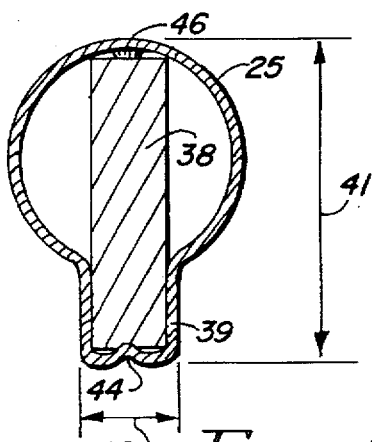
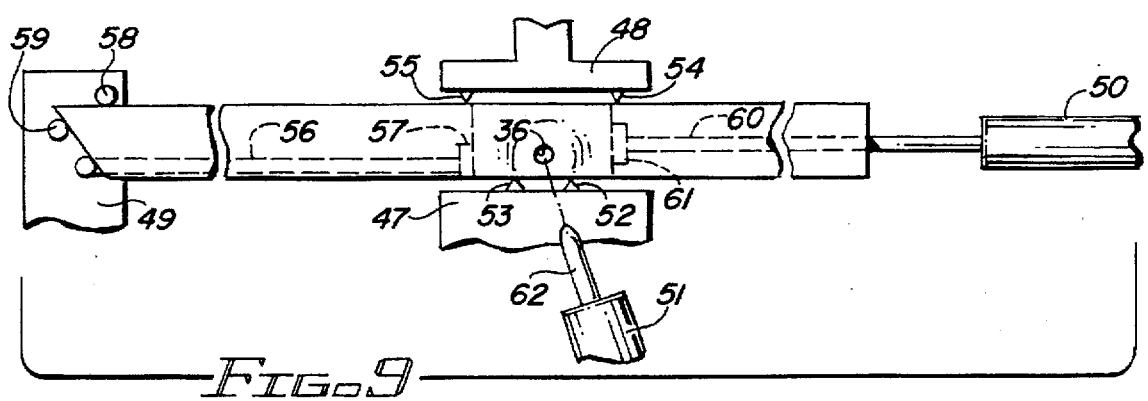

5,715,775

BEARING INSERT FOR PIVOTED CONNECTIONS

BACKGROUND OF THE INVENTION

The present invention relates to an improved pivot arrangement for holding structural members in pivotal engagement. Although useful in a wide range of mechanical arts areas, the invention has particular utility in cattle stanchions for holding and releasing cattle during milking, feeding and/or veterinary treatment, and in this specification the invention will be illustrated by reference to cattle stanchion systems.

For devices of this nature, reference may be made to prior Anderson U.S. Pat. No. 4,457,265 entitled Self-Latching Stanchion and System for Cattle and the Like. As shown in the stanchion system disclosed in the Anderson patent and in FIGS. 1 and 2 of the present specification, each stanchion section 21 includes a "release stanchion member" 25 and a "stanchion pivot member" 26. The release stanchion is movable in that it pivots a distance in a clockwise/counterclockwise direction about the pivot stanchion 26. As detailed in FIG. 1, release stanchion 25 is pivoted to the pivot stanchion 26 at pivot point 31. Also, as shown in greater detail in FIG. 2 (Anderson's FIG. 6), pivot 31 includes a U-shaped clevis 72 which is attached to the pivot stanchion and which actually forms the pivot with a hole in the flattened portion 75 of release stanchion 25. The stanchions are usually made from 1½ inch galvanized steep pipe.

In operation, there is necessarily considerable movement of the release stanchion about the pivot point, and considerable stress is placed on this pivot point. Experience has shown that this movement and stress cause the clevis to wear on the release stanchion pipe where the clevis passes through the hole in the pipe. As the hole is enlarged through wear, proper operation is affected, and eventually the apparatus must be dismantled and the stanchion pipe replaced.

It is an object of the present invention to provide an improved pivot arrangement which withstands pivotal wear for substantially increased periods of time.

It is another object of the invention to provide a simple, uncomplicated bearing device which can be manufactured readily from standardly available materials and is adapted for easy installation in the assembly of the pivoted structure.

It is a further object to provide a sequence of method steps for installing and aligning the improved bearing in the pivoted assembly.

Other objects and advantages will become apparent as the specification proceeds.

SUMMARY OF THE INVENTION

The present invention is based on the concept of securing a high molecular weight, high density, wear-resistant resin insert on the interior of the structural member which contains the pivot hole, and providing a bearing channel in said resin insert. The channel is registered with the pivot hole, so that a pivot pin inserted through the pivot hole in the structural member is also inserted through the bearing channel and the major wearing contact is between the pivot pin and the interior surface of the wear-resistant bearing channel. In this manner, the wear on the structural pipe itself is avoided, and the life of the structural members is thus substantially prolonged.

Stated in general terms, therefore, the present invention is an improvement in the pivotal arrangement used in an assembly of structural elements wherein a first tubular structural element is held in pivotal engagement with a second structural element by means of a pivot pin mounted on the second element and passing through an aperture in the first structural element, the improvement comprising: a high molecular weight, high density resin insert positioned on the interior of the first structural element at the point of said aperture. The resin insert has wear-resistant properties greater than those of the material from which the first tubular element is made. The resin insert is provided with a tubular hole, said hole being in registration with the aperture in the first structural element and providing a bearing channel for receiving the pivot pin of the second structural element. The resin insert is provided with means for securing it against movement within the first structural element, whereby the bearing channel in the insert is maintained in registration with said aperture to protect the first structural element against wear caused by rotation of the pivot pin.

The invention also relates to a method for providing a tubular structural member with a reinforced pivot hole comprising the steps of punching a pair of holes in opposing walls of the structural member; pressing the walls inwardly to provide an internal pocket having a predetermined dimension; forming a high molecular weight, high density resin block having a width approximately equal to the inside diameter of the tubular structural member and a thickness the same as or slightly smaller than the predetermined dimension of the internal pocket; drilling a tubular channel through the width of the resin block, the diameter of the tubular channel being slightly less than the diameters of the pair of pivot holes in the opposing walls of the tubular structural member; inserting the resin block in the internal pocket; concentrically aligning the tubular channel in the resin block in registration with the pair of pivot holes; and depressing the wall of the tubular structural member to provide dimples for engaging the edges of the resin block and holding it against movement within the pocket; whereby a pivot pin inserted through the pair of holes is held by the said tubular bearing channel out of contact with the walls of the tubular structural member, and the walls are thereby protected against wear from the rotation of the pivot pin.

BRIEF DESCRIPTION OF THE DRAWINGS

The objects, features and advantages of the invention will be apparent to those skilled in the art from the following description, taken together with the accompanying drawings, in which:

FIG. 5 is a sectional top view of the release stanchion, taken in the direction of arrows 5—5 of FIG. 3.

FIG. 6 is a sectional top view of the release stanchion, taken in the direction of arrows 6—6 of FIG. 3, and showing the positioning dimple engaging the top edge of the resin insert block.

FIG. 7 is a sectional top view of the release stanchion, taken in the direction of arrows 7—7 of FIG. 3, and showing the alignment of the bearing channel with the pair of holes in the tubular release stanchion.

FIG. 8 is a sectional top view of the release stanchion, taken in the direction of arrows 8—8 of FIG. 3, and showing the bottom positioning dimple engaging the side edge of the resin block.

FIG. 9 is a schematic illustration of apparatus useful in inserting and securing the plastic bearing block in a typical stanchion member.

DETAILED DESCRIPTION OF THE INVENTION

The features of the present invention can be used for improvement of the pivotal arrangement in a wide variety of structural designs. However, for simplification of the description, and without limiting the scope of the invention, the invention will be described in relation to the pivotal arrangement in a cattle stanchion arrangement.

Figure 1:
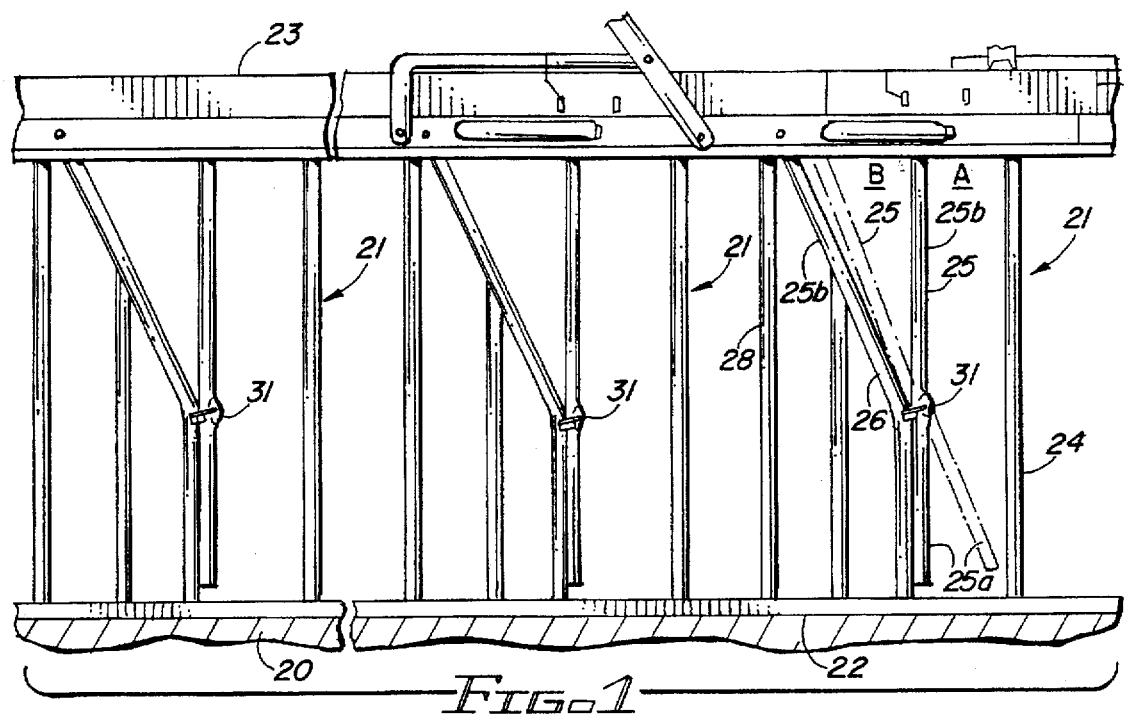
FIG. 1 is a side elevational view of a cattle stanchion system in which the improved pivot arrangement of the present invention is useful.

Referring to the drawings, FIG. 1 illustrates a stanchion apparatus 20, including three stanchion sections 21 each for an individual animal, cows for example. Three sections are of course exemplary as many more, or fewer, may be embodied in the apparatus, for example, up to and including 100. The stanchion apparatus 20 includes a base member 22 and an upper member 23.

Each individual stanchion section includes a fixed stanchion member 24, a release stanchion member 25, a stanchion pivot member 26, and bracing members 27 and 28. The release stanchion member 25 has two positions, a closed position as shown by the vertical solid lines in FIG. 1 and an open position as shown by the dot-dash lines in FIG. 1. In the vertical or closed position of release stanchion member 25, the space between stanchion members 24 and 25 defines the space A within which a cow's neck is disposed when the animal is locked into position. When the release stanchion 25 is in the angular or slanted position, as shown by the dot-dash lines, the space A becomes enlarged to include the space B so that the cow can move its head.

Under various conditions it is intended that a cow may come into a barn with the release stanchions 25 in the open position so that a cow may dispose its head in the space A plus B and in lowering its head for feeding the cow's neck will come into contact with a lower portion 25a and cause the release stanchion to pivot clockwise about the pivot 31 to the vertical position. After reaching this position the release stanchion is latched into place and the cow held with its head on the far side of the stanchion members. Later, when the operator releases the release stanchion 25, the stanchion member, under the influence of gravity, will pivot counterclockwise to the position shown in dot-dash lines in FIG. 1, whereby the cow may remove its head and move out of the barn.

The release stanchion 25 consists of two parts, or legs, 25a and 25b, and is pivoted to the pivot stanchion at the pivot 31. As shown in FIG. 1, the pivot stanchion 26 includes a lower portion, or leg 26a and an upper portion, or leg 26b, the lower leg 26a being attached, as by welding, to the base member and the upper leg being attached, as by welding, to the top portion. The upper leg 26b of pivot stanchion 26 is at an angle to the lower leg 26a so as to form a knee at the pivot area 31. The angularity of the upper leg 26b is such that when the upper leg 25b of the release stanchion 25 is disposed parallel to the leg 26b, the space A and B together form a sufficiently large space for a cow, for example, to dispose her head through the opening. This constitutes the open position of the release stanchion.

Figures 2, 3, 4:
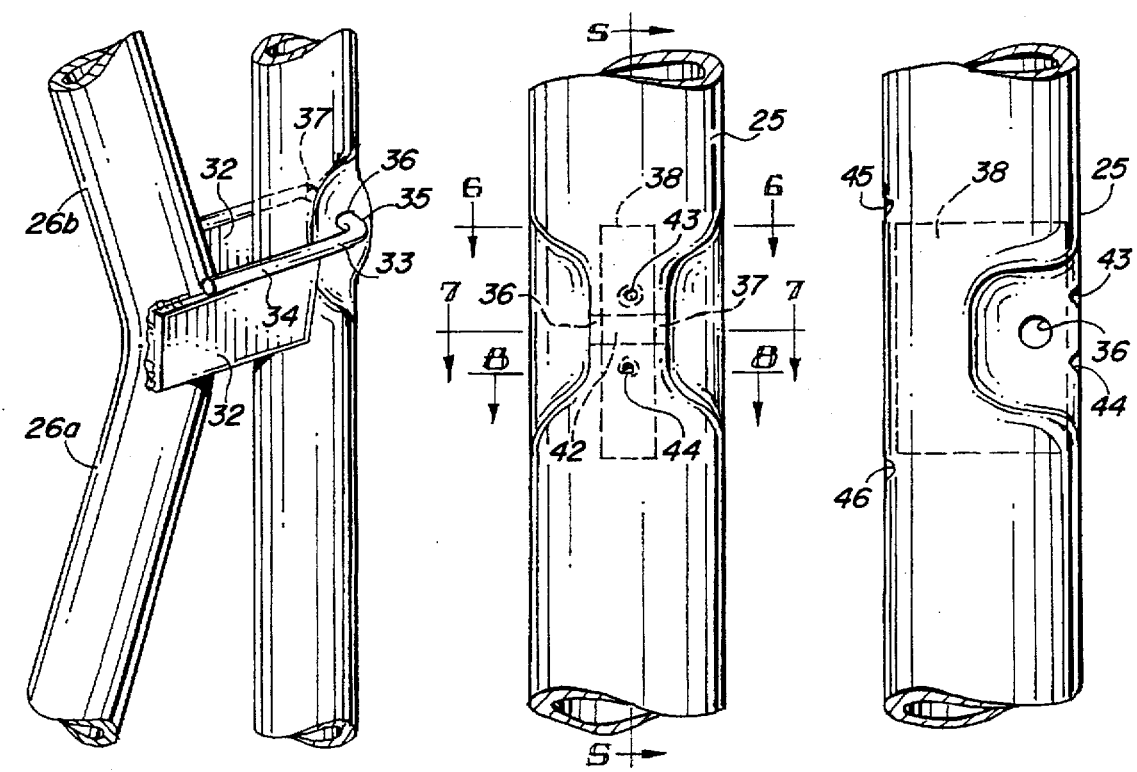
FIG. 2 is a fragmentary view, in perspective, of one of the pivot assemblies utilized in the structure of FIG. 1.
FIG. 3 is a front view, in perspective, of the pivot area of a release stanchion which incorporates the improved bearing arrangement of the present invention.
FIG. 4 is a side view, in perspective, of the release stanchion of FIG. 3.

As shown in FIG. 2, the pivot 31 comprises a pair of parallel plates 32 welded on each side to the knee between pivot stanchion members 26a and 26b and a U-shaped clevis member 33 welded at 34 along each of its legs to the parallel plates 32. The link 35 between the legs of the U-shaped clevis 33 actually forms the pivot with a pair of holes 36 and 37 through the release stanchion 25 between upper and lower portions 25b and 25a. The location of the holes 36 and 37 for the pivot pin or link 35 is offset toward the right from the center line of the release stanchion 25. The release stanchion is thus heavier on the left hand side and will pivot to the open position whenever the stanchion is not latched. The cow does not need to nudge the arm 25b toward the open position. The stanchion flaps open on its own.

Over a period of time, in the course of processing large numbers of cattle, the release stanchion 25 is activated incessantly, and the wear on the pivot holes 36 and 37 takes its toll on the galvanized steel from which the release stanchion is made. The holes become larger and misshapen, and the operation and balance of the mechanism worsens and finally fails, thus requiring dismantling of the apparatus and replacement of the stanchions.

In the improvement on which the present invention is based, a durable wear-resistant plastic block 38 is inserted into the pivot area 31 in such position as to receive the wear and tear from the pivot pin 35 and thus spare the holes 36 and 37 from rotational movement of the pivot pin. The plastic material for use in the insert block may be any of the known ultrahigh molecular weight, high-density polymers which provide wear-resistant properties superior to galvanized steel or any of the other metals from which tubular stanchions are ordinarily made. A suitable plastic material is sold under the trademark 1900 UHMW by Hercules Incorporated, Wilmington, Del. It is described as an ultrahigh molecular weight, high-density polyethylene resin having a molecular weight range between 3 and 6 million. Blocks of this material can be sawed, milled, turned, planed, drilled or punched on equipment conventionally used for fabricating wood or metals. The polymer is superior to known construction metals in terms of resistance to wear, abrasion, impact and chemicals, and in addition possesses high energy absorption and self-lubricating properties which make it useful for withstanding the rigorous action in the pivot areas of cattle stanchions.

The stanchion 25 is prepared for receiving the plastic insert by first punching a pair of holes 36 and 37 in opposing side walls. As best shown in FIGS. 3, 4 and 6–8, the holes are punched offset from the center line of the stanchion, and the punching operation tends to flatten the opposing walls in the area of the holes. In this operation the walls do not collapse completely, but rather they remain spaced apart to provide a pocket 39 which is useful for receiving the plastic block 38. As shown in FIG. 8, the spaced apart walls form a pocket 39 having a width dimension shown by the numeral 40.

The plastic insert which provides the bearing surface for the pivot is prepared by first cutting a block of the plastic to size and then drilling a hole of appropriate diameter through the width thereof. In practice, it is desired that the finished block of plastic have a thickness the same as or slightly less than the dimension 40 of the pocket 30 which has been prepared in the stanchion member, and it is also desired that the width of the block be slightly less than the inside diameter of the stanchion, e.g., the dimension 41 shown in FIG. 8. Thus, in a stanchion member made of galvanized steel pipe with an inside diameter of 1½", and a pocket with a dimension 39 of ½", a plastic block with a thickness of slightly less than ½", a width of slightly less than 1½", and a length of 1¾" is suitable.

Before insertion of the block 38 into the stanchion 25, a hole is drilled through the width of the block to provide a bearing channel 42 which will ultimately receive the pivot pin 35. The hole should be made approximately midway along the length of the block 38 and, as shown in FIG. 7, should be positioned along the width of the block at a point where it registers with the holes 36 and 37 which have been previously punched in the stanchion. It is only necessary that the location of the channel 42 be approximately determined at this stage, since the more precise alignment of the channel 42 with the holes 36 and 37 is accomplished at a later point. The diameter of the hole which is drilled in plastic insert 38 to provide channel 42 should be slightly less than the diameter of holes 36 and 37 which have been previously punched in stanchion 25.

The plastic insert block 38 is next inserted through one end of the tubular stanchion 25 and moved inwardly until it assumes the position shown in FIGS. 3–8, i.e., resting in the pocket 39 and having its bearing channel 42 approximately aligned in registration with the pair of holes 36 and 37 in the release stanchion 25. While in this position, a bullet-nosed tool is inserted through hole 36 or hole 37 to provide precise concentric alignment of the channel 42 with the holes 36 and 37. Since the bore of the channel 42 is slightly less than the diameter of holes 36 and 37, the concentric alignment provides a margin of plastic insert entirely around the circumference of each of the holes 36 and 37.

With the bullet-nosed tool still in position to maintain alignment, a ram punch is used to produce dimples 43, 44, 45 and 46 in the stanchion pipe 25 to lock the insert block 38 in permanent position. As will be seen from FIG. 5, the dimples 45 and 46 are located at the upper and lower ends of the block 38 and serve to hold the block against upward or downward movement. Dimples 43 and 44 project inwardly and make an actual depression in the deformable block 38, thus serving to anchor the block further against any other movement. With the insert block thus permanently fixed, and when the pivotal connection between release stanchion 25 and pivot stanchion 26 is made by inserting the pivot pin 35 through holes 36 and 37 and channel 42, the pivotal action between the two members can proceed without causing any wear on the galvanized steel edges of holes 36 and 37. The pivot pin 35 contacts only the interior of the plastic bearing channel 42 and is held completely out of contact with the metal release stanchion. Since the plastic insert is made of an ultrahigh molecular weight, high-density polymer which is greatly superior to the metal in terms of wear and abrasion resistance, and since it provides a self-lubricating function not available with the metal, the present invention greatly enhances the life of the stanchion members and improves the smoothness and ease of operation of the overall mechanism.

FIG. 9 is a schematic illustration of apparatus useful in inserting and securing the plastic bearing block in a typical stanchion member. The apparatus comprises a die bed 47, a superposed ram 48, an end stop member 49, a resin block inserting cylinder 50, and an alignment cylinder 51. The die bed 47 carries upwardly pointing spikes 52 and 53, and the ram 48 carries downwardly pointing spikes 54 and 55. The end stop member 49 carries a horizontally extending stop rod 56 (shown in dot-dash lines) which terminates in a stop bar 57, and member 49 also carries stop pins 58 and 59. The resin block inserting cylinder 50 carries a pusher rod 60 which terminates in a pusher bar 61. The alignment cylinder 51 carries a bullet-nosed alignment pin 62.

In operating with the apparatus of FIG. 9, a plastic block 38 is cut to size and drilled to form the tubular hole 42. A tubular stanchion member 25 is cut to length and then a pair of holes 36 and 37 are punched in the stanchion at a predetermined point. (Punching apparatus not shown.) The punching operation not only provides the holes 36 and 37 but also provides the flattening effect to produce the pocket 39 as shown in FIG. 7. The stanchion 25, with the pre-punched holes, is then slipped over the stop rod 56 and moved to the left until the end of the stanchion 25 contacts and is stopped by the stop pins 58 and 59 on member 49. At this point, ram 48 is lowered enough to hold the stanchion 25 securely, and then the plastic block 38, with its pre-drilled hole 42, is placed in the right hand end of the stanchion 25, and cylinder 50 is operated to push the block 38 to the left until it makes contact with and is stopped by stop bar 57. The block 38 is then in the pocket 39, and the pre-drilled hole 42 is approximately registered with holes 36 and 37 in stanchion 25.

As the next step, the alignment cylinder 51 moves in from the front and causes bullet-nosed alignment pin 62 first to engage hole 36 in stanchion 25 and then, as it moves further inwardly, to engage tubular bearing hole 42 in block 38. The bullet-nosed shape and the inward movement of the alignment pin 62 provide precise concentric alignment of the channel 42 with the holes 36 and 37. Since the bore of the channel 42 is slightly less than the diameter of holes 36 and 37, the concentric alignment provides a margin of plastic insert entirely around the circumference of each of the holes 36 and 37. The alignment is effectively achieved, even though no corresponding alignment pin is inserted into hole 37 from the opposite side.

As the final step, and with alignment pin 62 still inserted in hole 36 and channel 42 to maintain alignment, the ram 48 is lowered with full pressure to produce four dimples in the stanchion 25. Spikes 54 and 55 on the ram 48 produce dimples 45 and 46 (as shown in FIGS. 4–8), and spikes 52 and 53 on die bed 47 produce dimples 43 and 44. As previously indicated, these four dimples are effective to hold the plastic resin bearing block 38 securely in alignment.

The present invention provides the following features which are significantly advantageous in terms of simplicity and effectiveness of the arrangement:

1. Since the plastic insert is made of an ultrahigh molecular weight, high-density polymer which is greatly superior to the metal in terms of wear and abrasion resistance, and since it provides a self-lubricating function not available with the metal, the improvement of the present invention greatly enhances the life of the stanchion members and improves the smoothness and ease of operation of the overall mechanism.

2. The dimpled arrangement avoids the need for precision force-fitting to insert and maintain the plastic insert in proper alignment. Since the plastic resin and the galvanized steel have substantially different coefficients of contraction and expansion, it would be difficult to achieve a force-fitting alignment which would stay constant and effective in the different temperatures and other weather conditions to which cattle stanchion apparatus is subjected. The dimpled arrangement allows the plastic block to be cut to a slightly smaller size than needed and then easily slipped into its pocket, where it is then permanently secured by a simple dimpling action.

3. Although plastic polymers are normally adversely effected by sunlight and tend to deteriorate when subjected to ultraviolet rays, the arrangement of the present invention serves to shield the plastic from exposure to the sun.

Although the present invention has been disclosed in connection with certain preferred embodiments thereof, variations and modifications may be made by those skilled in the art without departing from the principles of the invention. All of these variations and modifications are to be considered to be within the true spirit and scope of the present invention as disclosed in the foregoing description and defined by the claims.

What is claimed:

1. In an assembly of structural elements wherein a first tubular structural element is held in pivotal engagement with a second structural element by means of a pivot pin mounted on said second element and passing through an aperture in said first structural element, the improvement comprising:
   a. a high molecular weight, high density resin insert positioned on the interior of said first structural element at the point of said aperture, said resin insert having wear-resistant properties greater than those of the material from which the said first tubular structure element is made;
   b. a tubular hole in said insert, said hole being in registration with said aperture in said first structural element and providing a bearing channel for receiving said pivot pin of said second element; and
   c. means for securing said resin insert against movement within said first structural element, whereby said channel is maintained in registration with said aperture to protect said first structural element against the wear caused by rotation of said pivot pin.

2. The assembly of claim 1 wherein said resin insert is an ultrahigh molecular weight, high density polyethylene resin having a molecular weight range between 3 and 6 million.

3. The assembly of claim 1 wherein said first structural element has been crimped to provide a pocket for receiving said resin insert.

4. The assembly of claim 1 wherein said first tubular structural element has been dimpled at the edges of said resin insert to provide the said means for securing said insert against longitudinal or rotational movement within said first structural element.

5. In a cattle stanchion apparatus having pivot stanchion and tubular release stanchion pairs defining openings for the heads of cattle, each stanchion pair having a pivotal connection between said pivot stanchion and said release stanchion to enable movement of said release stanchion between an open and closed position, the improvement comprising:
   a. a pivot pin fixed to the body of said pivot stanchion;
   b. a mating pivot hole in a wall of said release stanchion for receiving said pivot pin to provide said pivotal connection;
   c. a high molecular weight, high density wear-resistant insert positioned on the interior of said release stanchion at the point of said pivot hole;
   d. a tubular hole in said insert, said hole being in registration with said pivot hole in said release stanchion and providing a bearing channel for receiving said pivot pin when inserted through said pivot hole; and
   e. at least one dimple in said tubular release stanchion in the area of said pivotal connection for engaging said resin insert and holding it against movement within said release stanchion, whereby said channel is maintained in registration with said pivot hole to protect said release stanchion against the wear caused by rotation of said pivot pin.

6. The cattle stanchion apparatus of claim 5 wherein said pivot hole in said tubular release stanchion comprises a pair of holes in opposing walls of said stanchion, and the tubular bearing channel in said resin insert is in registration with said two holes.

7. The cattle stanchion apparatus of claim 5 wherein said tubular bearing channel in said resin insert is of a smaller diameter than said pivot hole in said release stanchion, whereby said pivot pin is held by said insert out of contact with the wall of said release stanchion.

8. A method for providing a tubular structural element with a reinforced pivot hole comprising the steps of punching a pair of holes in opposing walls of said structural element, inwardly pressing the said walls in the area of said holes to flatten said walls and reduce the distance between them to provide an internal pocket having a predetermined dimension; forming a high molecular weight, high density resin block having a width approximately equal to the inside diameter of said tubular structural element and a thickness slightly smaller than the predetermined dimension of said internal pocket; drilling a tubular channel through the width of said resin block, the diameter of said channel being slightly less than the diameters of said pair of pivot holes in the opposing walls of said structural element; inserting said resin block in the internal pocket in said tubular structural element; concentrically aligning said tubular channel in said resin block in registration with said pair of pivot holes; and depressing the wall of said tubular element to provide dimples for engaging the edges of said resin block and holding it against movement within said pocket; whereby a pivot pin inserted through said pair of holes is held by said tubular bearing channel out of contact with the walls of said tubular element, and the said walls are thereby protected against wear from the rotation of said pivot pin.

9. The method of claim 8 wherein said resin block comprises an ultrahigh molecular weight, high density polyethylene resin having a molecular weight range between 3 and 6 million.

* * * * *